United States Patent
Zhou et al.

(10) Patent No.: US 6,514,395 B2
(45) Date of Patent: Feb. 4, 2003

(54) NANOSTRUCTURE-BASED HIGH ENERGY CAPACITY MATERIAL

(75) Inventors: Otto Z. Zhou, Chapel Hill, NC (US); Bo Gao, Chapel Hill, NC (US); Saion Sinha, Durham, NC (US)

(73) Assignee: The University of North Carolina-Chapel Hill, Chapel Hill, NC (US)

(*) Notice: Subject to any disclaimer, the term of this patent is extended or adjusted under 35 U.S.C. 154(b) by 0 days.

(21) Appl. No.: 10/012,461

(22) Filed: Dec. 12, 2001

(65) Prior Publication Data

US 2002/0148727 A1 Oct. 17, 2002

Related U.S. Application Data (62) Division of application No. 09/594,844, filed on Jun. 15, 2000, now Pat. No. 6,334,939.

(51) Int. Cl.$^7$ .............................. G01N 27/26; B32B 3/00
(52) U.S. Cl. ...................... 204/409; 204/421; 423/345; 423/346; 257/741; 257/742; 428/209
(58) Field of Search ................................ 204/409, 421; 423/345, 346; 257/741, 742; 428/209

(56) References Cited

U.S. PATENT DOCUMENTS

| | | |
|---|---|---|
| 5,338,430 A | 8/1994 | Parsonage et al. |
| 5,457,343 A | 10/1995 | Ajayan et al. |
| 5,587,256 A | 12/1996 | Wilson et al. |
| 5,997,832 A | 12/1999 | Lieber et al. |
| 6,280,697 B1 | 8/2001 | Zhou et al. |

OTHER PUBLICATIONS

M. Winter et al., "Insertion Electrode Materials for Rechargeable Lithium Batteries," *Advanced Materials*, vol. 10, 1998, pp. 725–762. No Month.

M. S. Whittingham (Editor),"Recent Advances in Rechargeable Li Batteries," *Solid State Ionics*, vol. 69, No. 3, 4, 1994. No Month.

G. Pistoia (Editor), "Lithium Batteries: New Materials, Developments and Perspectives," Industrial Chemistry Library, vol. 5, *Elsevier*, 1994. No Month.

A. M. Wilson et al., "Carbonaceous Materials Containing Silicon as Anodes for Lithium–ion Cells," *Mat. Res. Soc. Proc.*, vol. 393, 1995, pp. 305–313. No Month.

R. S. Wagner et al., "Vapor–Liquid–Solid Mechanism of Single Crystal Growth," *Applied Physics Letters*, vol. 4, No. 5, 1964, pp. 89–90. No Month.

G. W. Zhou et al., "Controlled Li doping of Si nanowires by electrochemical insertion method," *Applied Physics Letters*, vol. 75, No. 16, Oct. 18, 1999, pp. 2447–2449.

J. R. Dahn, "Mechanisms for Lithium Insertion in Carbonaceous Materials," *Science*, vol. 270, Oct. 27, 1995, pp. 590–593.

R. N. Seefurth et al., "Investigation of Lithium Utilization from A Lithium–Silicon Electrode," *J. Electrochem. Soc.*, vol. 124, No. 8, Aug. 1977, pp. 1207–1214.

A. M. Morales et al., "A Laser Ablation Method for the Synthesis of Crystalline Semiconductor Nanowires," *Science*, vol. 279, Jan. 9, 1998, pp. 208–211.

Y. F. Zhang et al., "Silicon nanowires prepared by laser ablation at high temperature," *Applied Physics Letters*, vol. 72, No. 15, Apr. 13, 1998, pp. 1835–1837.

C. John Wen et al., "Chemical Diffusion in Intermediate Phases in the Lithium–Silicon System," *Journal of Solid State Chemistry*, vol. 37, 1981, pp. 271–278.

*Primary Examiner*—Cathy Lam
(74) *Attorney, Agent, or Firm*—Burns Doane Swecker & Mathis LLP (57) ABSTRACT

A nanostructure based material is capable of accepting-and reacting with an alkali metal such as lithium. The material exhibits a reversible capacity ranging from at least approximately 900 mAh/g–1,500 mAh/g. The high capacity of the material makes it attractive for a number of applications, such as a battery electrode material.

3 Claims, 7 Drawing Sheets

NANOSTRUCTURE-BASED HIGH ENERGY CAPACITY MATERIAL

This application is a divisional of Application No. 09/594,844, filed on Jun. 15, 2000, now U.S. Pat. No. 6,334,939.

STATEMENT REGARDING FEDERALLY SPONSORED RESEARCH OR DEVELOPMENT

At least some aspects of this invention were made with Government support under contract no. N00014-98-1-0597. The Government may have certain rights in this invention.

BACKGROUND OF THE INVENTION

In the description that follows references are made to certain compounds, devices and methods. These references should not necessarily be construed as an admission that such compounds, devices and methods qualify as prior art under the applicable statutory provisions.

With the increasing importance of batteries for a wide variety of uses, ranging from portable electronics to power supply devices for spacecraft, there is a long-felt need for new materials with higher energy densities.

The energy density of a material can be quantified by measuring the amount of electron-donating atoms that can reversibly react with the material. One way of obtaining such a measurement is by setting up an electrochemical cell. The cell comprises a container housing an electrolyte, one electrode made of the electron-donating material (e.g.—an alkali metal), another electrode made of the material whose capacity is being measured (e.g.—a silicon nanostructure-based material), and an electrical circuit connected to the electrodes. Atoms of the electron-donating material undergo an oxidation reaction to form ions of the donating material, and free electrons. These ions are absorbed by the opposite electrode, and the free electrons travel through the electrical circuit. Since the number of electrons "given away" by each atom of the electron-donating material is known, by measuring the number of electrons transferred through the electrical circuit, the number of ions transferred to the material being investigated can be determined. This quantity is the specific capacity of the material, and can be expressed as milliampere-hours per gram of the material. For example, the maximum specific (reversible) capacity of graphite to accept lithium is reported to be approximately 372 mAh/g. Because one lithium ion is transferred to the graphite electrode for every electron released, the specific capacity can be expressed in terms of the stoichiometry of the electrode material. For graphite, the saturation phase can be characterized as $LiC_6$ with Li ions residing between the graphene layers. See, for example, (M. Winter et al., Insertion Electrode Materials for Rechargeable Lithium Batteries, Advanced Materials, Vol. 10, 10, "725–762", 1998; and J. R. Dahn et al., Mechanisms for Lithium Insertion in Carbonaceous Materials, Science, volume 270, Oct. 27, 1995.

Lithium intercalated graphite and other carbonaceous materials are commercially used as electrodes for advanced Li-ion batteries. See, for example, M. S. Whittingham, editor, Recent Advances in rechargeable Li Batteries, Solid State Ionics, volumes 3 and 4, number 69, 1994; G. Pistoria, Lithium Batteries: New Materials. Development and Perspectives, Elsevier, 1994. The energy capacities of these conventional battery materials are partially limited by the $LiC_6$ Li saturation concentration in graphite (equivalent to 372 mAh/g).

In order to increase the capacities of electrode materials other carbon based-materials have attracted attention as potential electrode materials. Disordered carbon (soft and hard carbon) materials show reversible lithium storage capacities higher than that obtained from graphite (see, for example, J. R. Dahn et al., Mechanisms for Lithium Insertion in Carbonaceous Materials, Science, volume 270, Oct. 27, 1995). Single wall carbon nanotube bundles have a large reversible Li storage capacity of 1000 mAh/g, but at a large voltage hysteresis.

Lithium alloys have been investigated as possible anode materials for Li-based batteries. Si and Ge are known to form Li-rich alloys with compositions up to $Li_{22}Si_5$ or $Li_{22}Ge_5$. They have been investigated for application in high temperature molten salt batteries (see, for example, R. N. Seefurth and R. A. Sharma, Investigation of lithium utilization from a lithium-silicon electrode, J. Electrochem. Soc., Vol. 124, No. 8, 1207–1214, 1977). However, electrochemical reaction of Li with Si or Ge is only possible at high temperatures (higher than 350° C.).

Pyrolysis of carbon and silicon-containing precursors has yielded materials with enhanced Li storage capacity (500–600 mAh/g) (see, e.g.-Carbonaceous materials containing silicon as anodes for lithium-ion cells, Mat. Res. Soc. Proc., Vol. 393, page 305–313, 1995).

It would be desirable to develop other materials having improved energy storage capacities and energy transfer properties. There exists a long-felt, but so far unfulfilled need, for a material having such properties. There exists a need for a material having improved properties that make it useful in battery electrodes and other high energy applications.

SUMMARY OF THE INVENTION

These and other objects are attained according to the principles of the present invention.

One aspect of the present invention includes a material comprising a nanostructure that can reversibly react with foreign species. The material having a reversible capacity of at least 900 mAh/g.

Another aspect of the present invention includes a material comprising silicon rod or wire-like nanostructures and intercalted lithium, the material having a reversible capacity of at least 900 mAh/g.

A further aspect of the present invention includes a germanium-based material comprising a germanium and germanium oxide nanostructure. The material having a reversible capacity of at least 1000 mAh/g.

In another aspect of the present invention, an article comprising an electrically conductive substrate, and a film deposited on the substrate which comprises any of the above-described materials. The article may take the form of an electrode for a battery.

DETAILED DESCRIPTION OF PREFERRED EMBODIMENTS

A nanostructure-containing material can be formed by a number of techniques familiar to those skilled in the art, such as laser ablation of a target material, solution synthesis or chemical vapor deposition.

While the particular technique used to produce nanostructures is not essential to the practice of the present invention, a brief description of the production of such nanostructures is is given below for purposes of illustration.

Numerous nanostructure materials are contemplated by the present invention. For example, nanostructures formed from silicon (Si), germanium (Ge) and aluminum (Al), silicon oxide and germanium oxide are specifically contemplated.

According to typical laser ablation techniques, a target is placed within a chamber. Preferably, the target contains a suitable catalyst such as iron (Fe) or gold (Au). The chamber is evacuated and then filled with inert gasses such as argon. The target is heated and then ablated with a suitable energy source such as a pulsed laser.

As the target is ablated, nanostructure-containing material is recovered from the vaporized target.

The nanostructure materials formed according to the technique described above are generally either cage-like spherical particles or rod/wire shaped objects having nanometer-scale dimensions.

Figure 1:
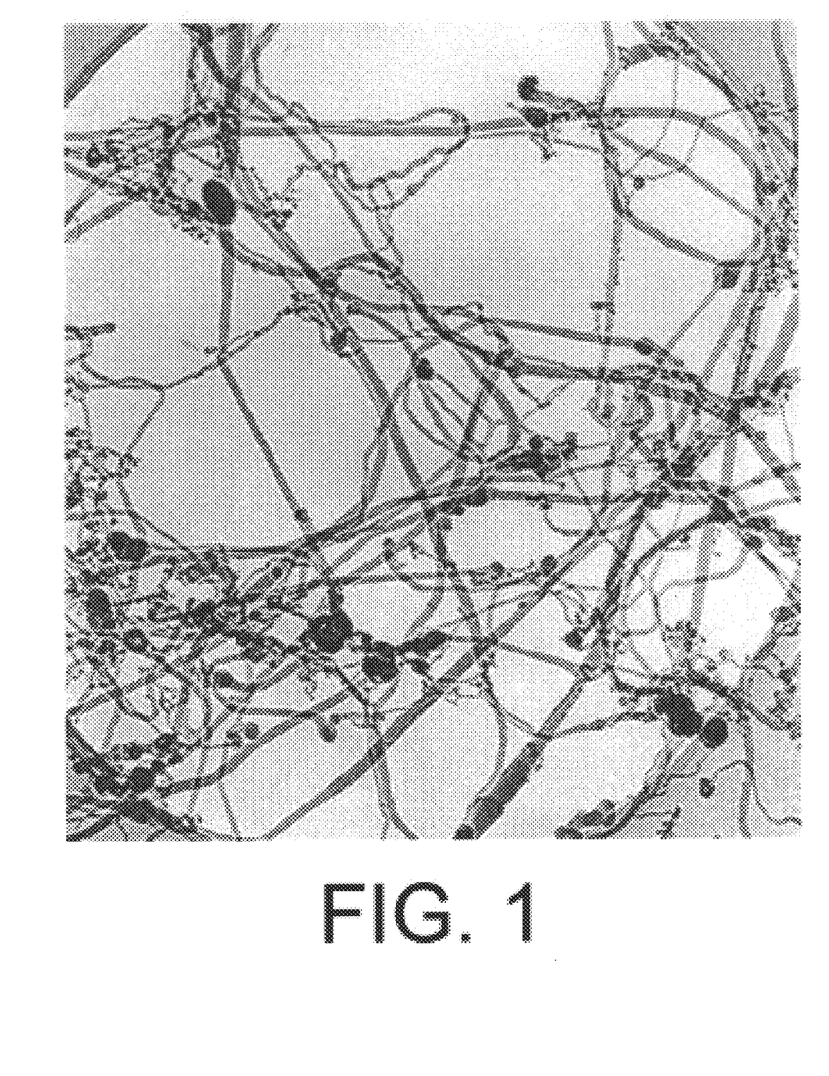
FIG. 1 is a transmission electron microscope (TEM) micrograph of silicon nanostructures fabricated by a laser ablation method.
Figure 2:
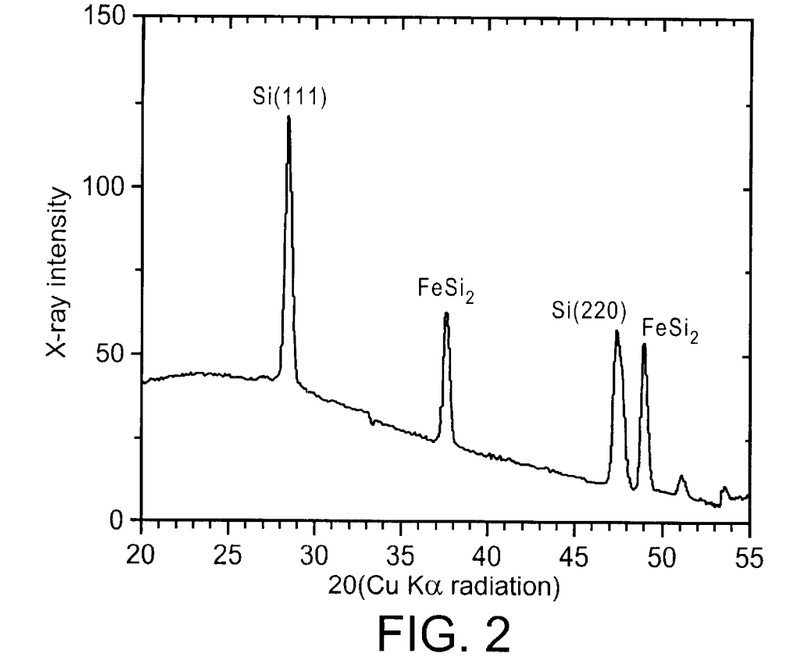
FIG. 2 is a powder x-ray diffraction pattern of the silicon nanostructures used to store lithium.

For example, silicon nanostructures may comprise rod or wire-like shapes having a diameter on the order of 1–50 nm and a length on the order of 0.5–10 $\mu$m. FIG. 1 is a TEM micrograph of silicon nanostructures formed by a laser oblation technique. FIG. 2 is an x-ray diffraction pattern of these silicon nanostructures. The $FeSi_2$ peaks are caused by the Fe catalysts present in the Si target. Moreover, the outer surfaces of the nanostructure objects are typically covered by thin layers of silicon oxides.

Nanostructures apparently have higher surface to volume ratio than the bulk material from which they are derived or from other forms of the material such as whiskers (see, for example, R. S. Wagner and W. C. Ellis in Appl. Phys. Lett., Vol. 4, page 89, 1964 for the synthesis of Si whiskers).

The nanostructures are more reactive and may also have a lower melting temperature than the bulk materials. Therefore nanostructures formed of various materials such as Si, Ge, and Al exhibit increased reactivity and increased ability to reversibly react with alkali metals such as lithium.

Figure 3:
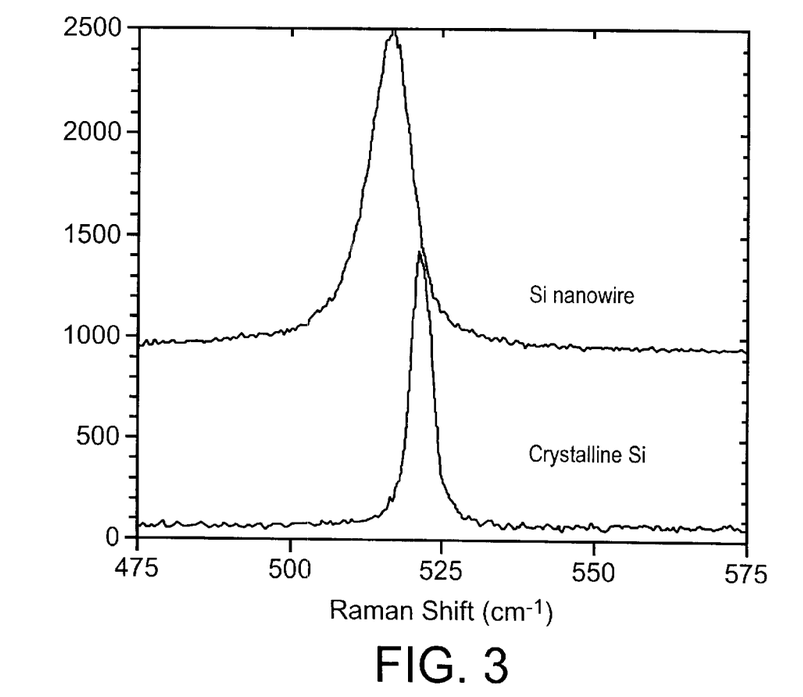
FIG. 3 is a Raman spectrum of the silicon nanostructures of the present invention.

For instance, FIG. 3 illustrates another difference between bulk materials and nanostructures formed therefrom. As shown in FIG. 3, the spectrum from bulk crystalline Si is compared with that of nanostructured Si. The characteristic Si $sp^3$ stretching mode for nanostructured Si is slightly down-shifted from that of bulk crystalline Si.

One suitable technique for producing silicon nanostructures is described in A. M. Morales and C. M. Lieber, A Laser Ablation Method for the Synthesis of Crystalline Semiconductor Nanowires, *Science,* 279, 208–211, 1998; and Y. F. Zhang and et al., Silicon nanowires prepared by laser ablation at high temperature, *Appl. Phys. Lett.,* 72, 15, 1835–1837, 1998.

Figure 4:
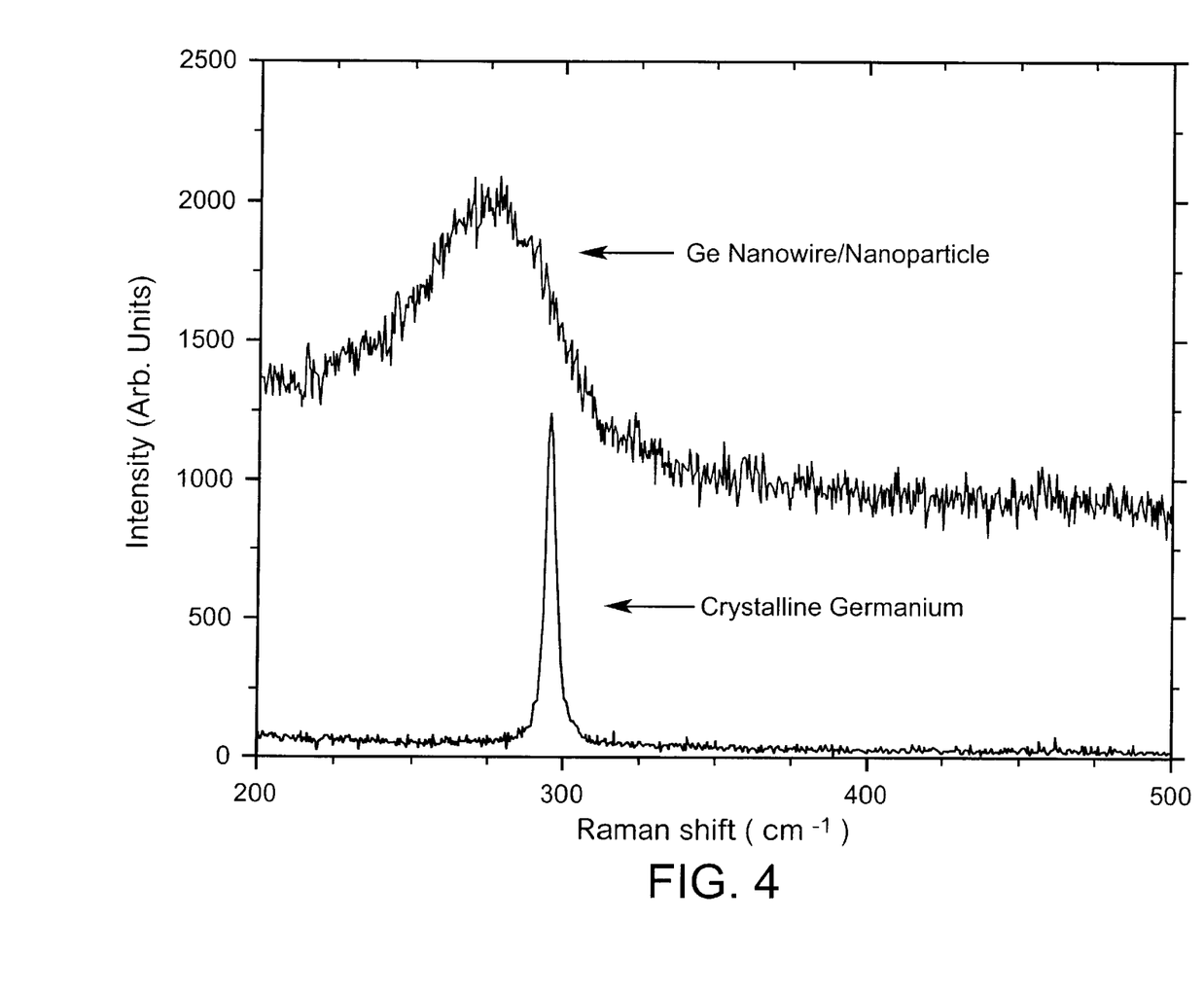
FIG. 4 is a Raman spectrum of the germanium nanostructures of the present invention.

Similarly, FIG. 4 illustrates the characteristic Ge $sp^3$ stretching mode of nanostructured Ge as being slightly down-shifted from that of the bulk crystalline Si.

Nanostructured Ge was synthesized using the laser ablation method (e.g.- Morales and Lieber, Science vol. 279, 208–211, 1998). Target composed of Ge and Fe (10 atm.%) was ablated by a pulsed Nd:YAG laser at 900C. under a constant flow of argon. Electron microscopy measurements show that thus synthesized materials comprise both Ge nanowires with an average diameter of 5–30 nm and micron in length, and nanoparticles with the average diameter of 1–50 nm.

Figure 5:
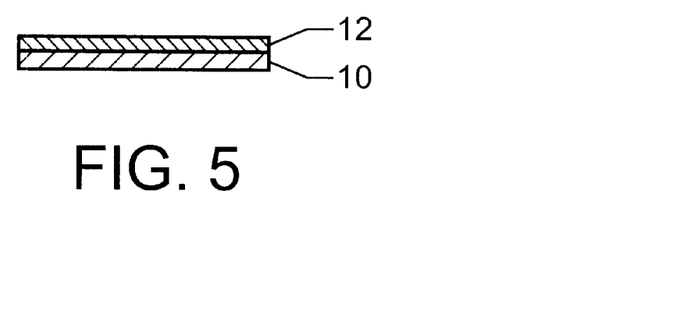
FIG. 5 is a cross-sectional view of a nanostructure-coated substrate according to the present invention.

Another advantage of the nanostructure materials of the present invention is that they can be rather easily deposited as a film onto a substrate material. For example, as illustrated in FIG. 5, a sample of purified nanostructure material can be solution-deposited to form a coating 12 on an appropriate substrate.

Nanostructure-based materials of the present invention unexpectedly possess specific lithium storage capacities that exceed those possessed by conventional carbon-based materials.

As described in the Background, in a testing electrochemical cell, the lithium ions travel from the lithium electrode to the nanostructure material electrode during discharge. The lithium ions are readily accepted into the large surface area of the nanostructure material. When a lithium ion is accepted into the nanostructure material according to the present invention a chemical reaction takes place, even at temperatures on the order of 300° K. and a distinct lithium-nanostructure material phase is formed, thus forming an "alloy" therewith. This reaction acts as a storage mechanism that enables the material to hold a charge (i.e.-in the form of lithium ions). As noted above, nanostructure materials exhibit increased reactivity. For example, while conventional macroscopic silicon must be heated to a temperature on the order of 400° C. to react with lithium (see, for example, R. N. Seefurth and R. A. Sharma, Investigation of lithium utilization from a lithium-silicon electrode, *J. Electrochem. Soc.,* Vol. 124, No. 8, 1207–1214, 1977; C. J. Wen and R. A. Huggins, Chemical diffusion in intermediate phase in the lithium-silicon system, *J. of Solid State. Chem.,* 37, 271–278 (1981).), the silicon nanostructure material of the present invention electrochemically reacts with lithium at room temperature or even lower.

Figure 6:
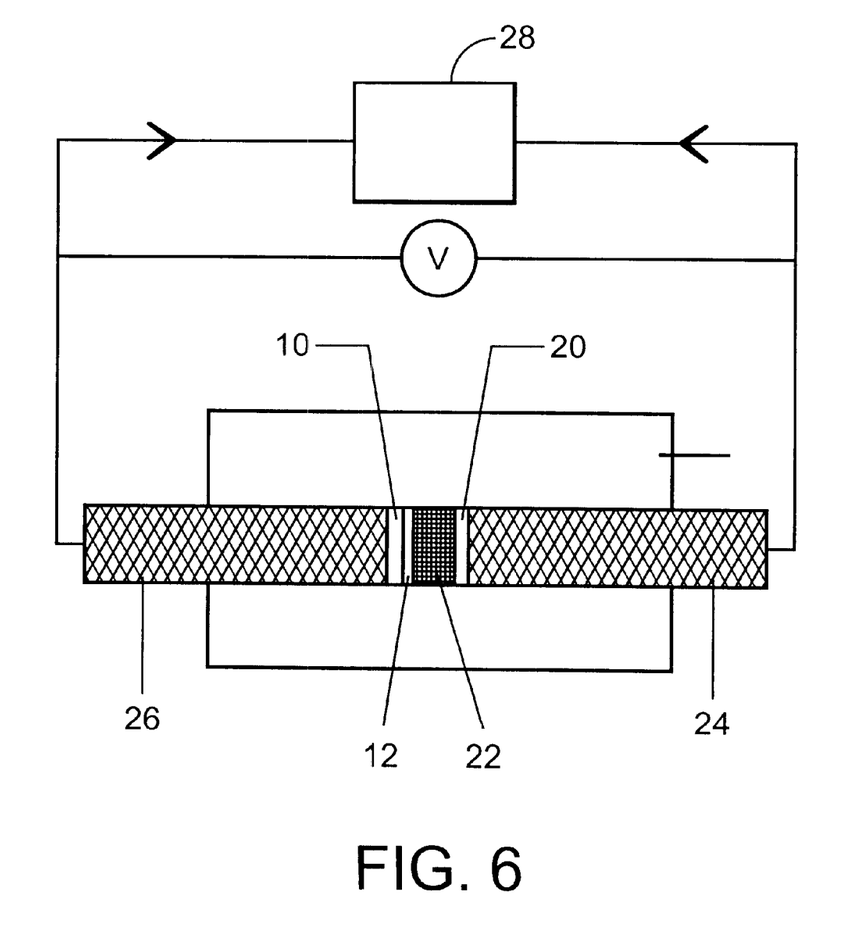
FIG. 6 is an electrochemical cell incorporating an electrode material of the present invention.

The energy density, or ability of the silicon nanostructure material of the present invention to accept foreign species, such as alkali metals, and more specifically lithium, was measured by constructing a electrochemical cell, similar to that described in the Background section above. An electrochemical cell incorporating the silicon nanostructure-based material of the present invention is schematically illustrated in FIG. 6.

A cell was constructed with a lithium foil electrode 20 and a stainless steel substrate plate 10 having a nanostructure film 12 deposited thereon, as the second electrode. A polypropylene filter soaked with an electrolyte 22 was placed between the two electrodes. Electrical contacts were made by two stainless steel plungers 24, 26 pressed against the electrodes. A current source 28 is connected to the plungers. The cell was then discharged and charged.

The nanostructure-lithium materials of the-present invention have significantly higher capacities than conventional materials. For example, the silicon nanostructure-lithium materials of the present invention have exhibited capacities of 1500 mAh/g in the first discharge cycle, reversible capacities on the order of at least 900 mAh/g to at least approximately 1,000 mAh/g and an irreversible capacity of less than 500 mAh/g. Lithium discharge occurs at essentially a constant voltage below 0.1V. Most of the lithium can be removed from the nanostructured silicon electrode at below 0.5V.

Figure 7:
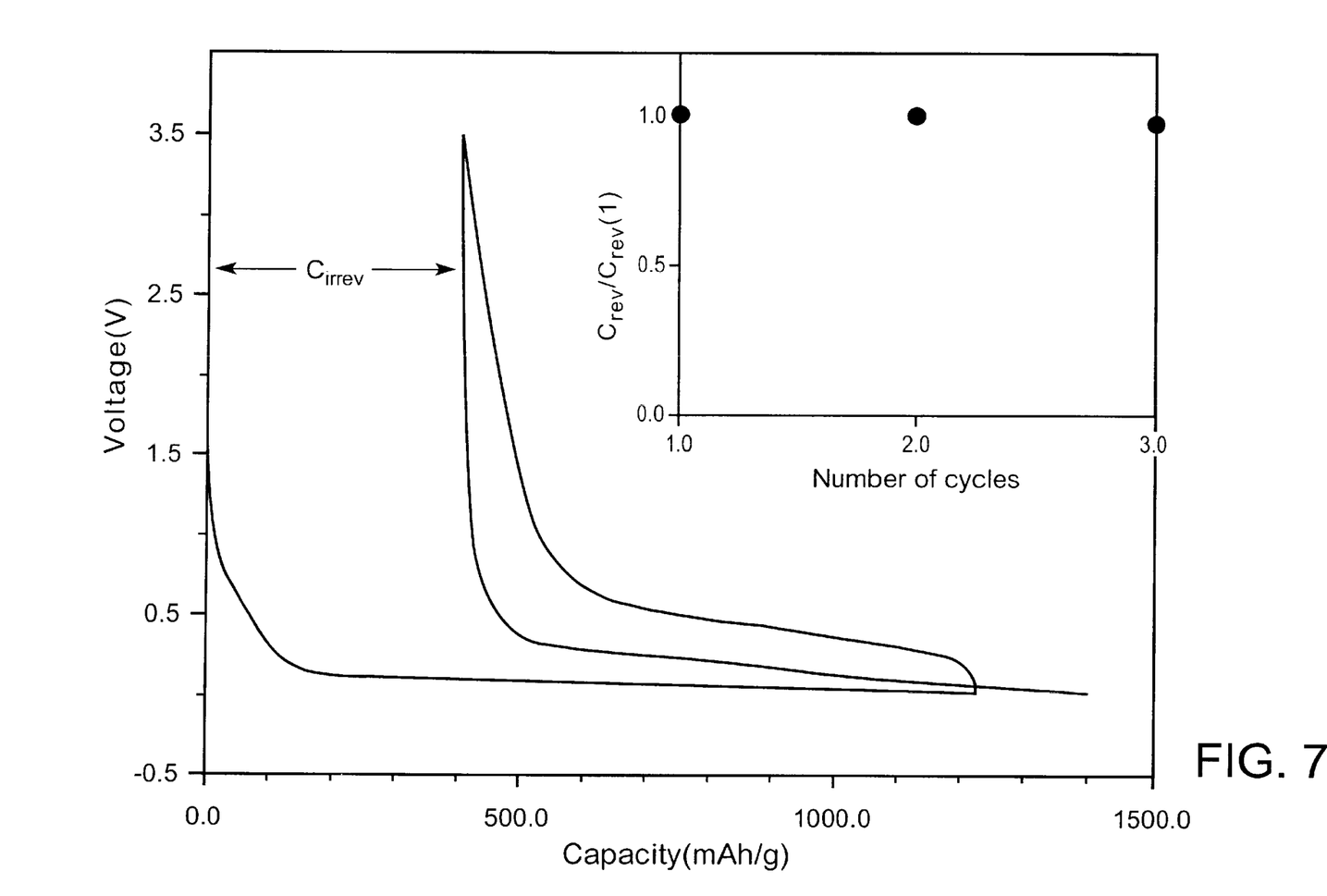
FIG. 7 is a graph showing the charge-discharge characteristics of a silicon nanostructure material formed according to the principles of the present invention.
Figure 8:
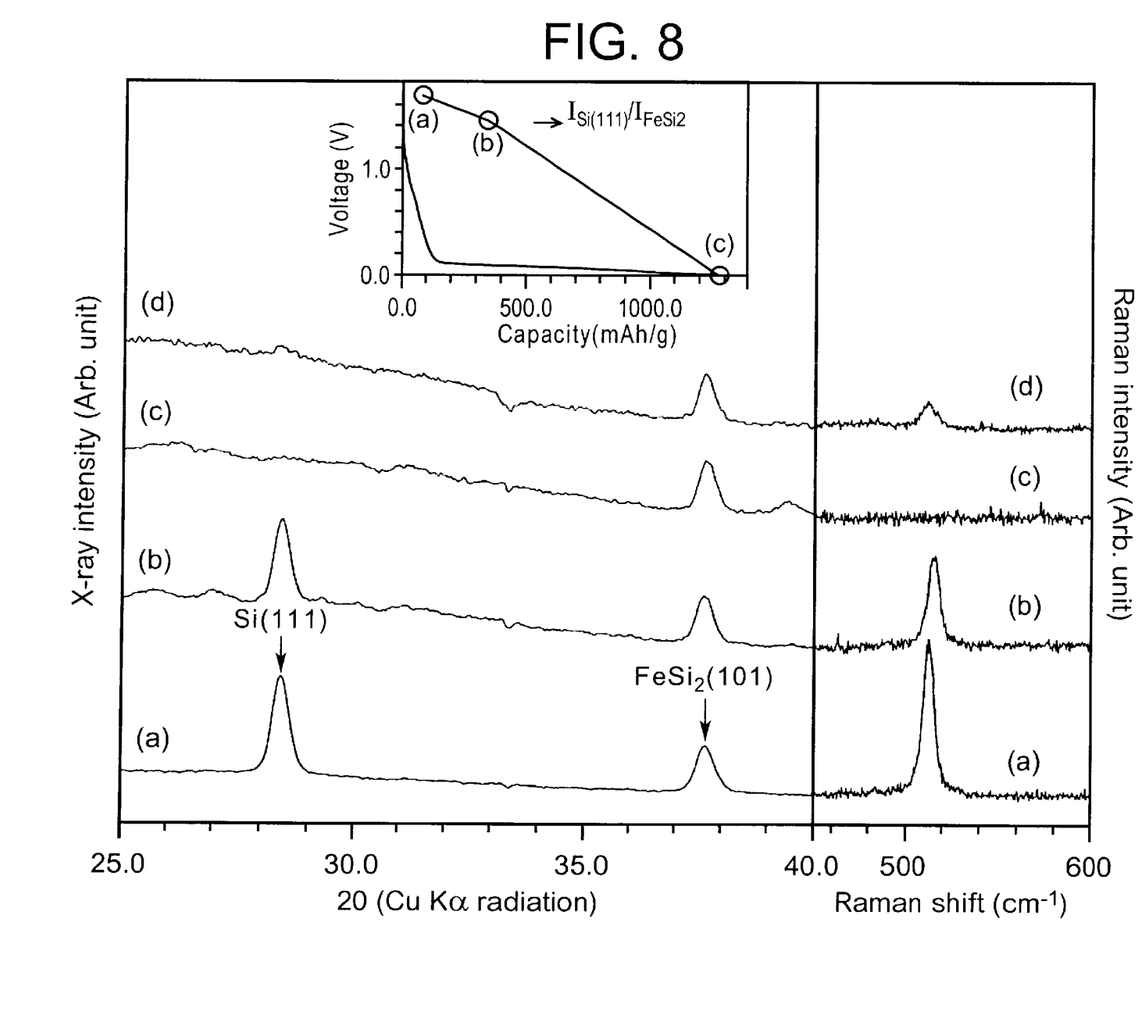
FIG. 8 shows the powder x-ray diffraction and Raman spectra collected from the electrode containing the silicon nanostructures at different stages of the first discharge cycle.

FIG. 7 is a voltage-capacity plot for a fully lithiated silicon nanostructure sample that showed a total capacity of approximately 1300 mAh/g. The reversible part, defined as the capacity displayed after the second discharge, is approximately 800 mAh/g. The inset of FIG. 7 illustrates the capacity of the material versus the number of charge-discharge cycles. FIG. 8 illustrates x-ray diffraction and Raman spectrum data collected from a Si nanostructure electrode at different stages of the first discharge cycle.

The x-ray and Raman intensities from the nanostructured Si decreases with increasing Li concentration and vanished in the fully lithiated state(spectra a, b and c). The characteristic Si $sp^3$ stretching mode re-appeared in the Raman spectrum in the electrode at the end of the first charge (spectrum d), indicating recovery of $sp^3$ Si after extraction of Li. Inset shows the voltage versus capacity data from the same cell and the integrated x-ray intensity ratio of the Si (111) and FeSi2 peaks (FeSi2 is inert to Li and is used as the internal reference).

Figure 9:
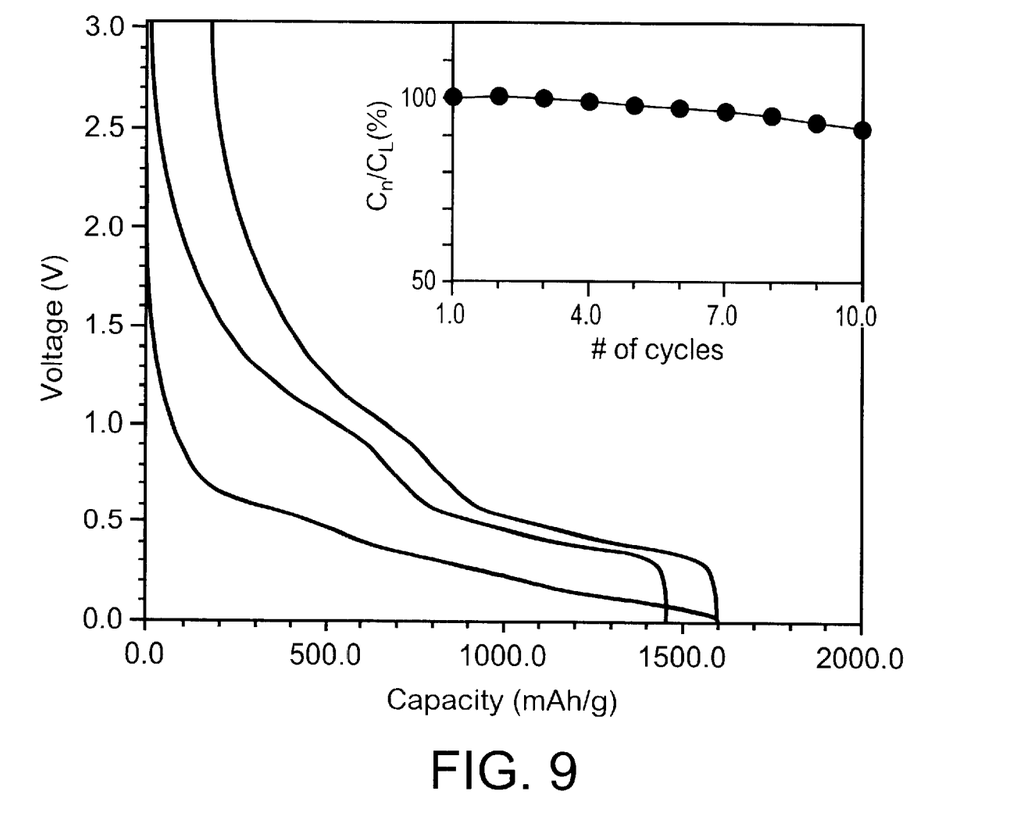
FIG. 9 is a graph showing the charge-discharge characteristics of a germanium nanostructure material formed according to the principles of the present invention.

FIG. 9 illustrates the second-cycle charge-discharge data from a sample containing nanostructured Ge and Ge oxide, after vacuum annealing at 150° C. The data were collected under galvanostatic mode using 50 mA/g rate at 300 K. The reversible Li capacity is 1500 mAh/g (normalized with the total sample weight, the value will be higher than the total capacity is normalized with weight of nanostructured Ge, excluding the Fe catalysts). A distinct voltage step is present during both Li insertion and extraction.

Another important performance parameter is how the rate of charging and discharging affects the capacity of the material. Some applications, such as electrical vehicles, require the electrode material to operate under high rate charging and discharging conditions. Generally, the capacity of the material decreases with an increased rate. The nanostructure-lithium material of the present invention exhibits high capacities, even when charged/discharged, at high rates.

Yet another important performance parameter is the electrochemical potential with respect to Li. For example, lithium insertion into the current Si nanostructure based material occurs below 0.1 V and lithium extraction takes place mostly below 0.5 V. This means that the nanostructured silicon based materials can replace the current carbon based negative electrodes in the Li-Ion batteries without reduction in the cell voltage.

According to the present invention, it is also possible to further increase the Li storage capabilities of the nanostructure materials through addition processing of the material. For example, nanostructured Si samples from the same batch were annealed at different temperatures (200–900 C.) under $5 \times 10^{-6}$ torr vacuum. Their charge/discharge characteristics were measured under the same conditions as described above. The total discharge and reversible Li capacities were found to initially increase with the annealing temperature up to ~600 C. then decrease with further increase of the annealing temperature. Annealing is believed to remove chemical species on the surfaces of nanostructured Si. These chemical species and oxide coating can also be removed by other processes such as hydrogen plasma.

The excellent capacity of the nanostructure-based materials of the present invention, combined with their superb mechanical and electrical properties, and the ease of forming films, make them attractive electrode materials for high energy density batteries (e.g.-high energy density Li-ion batteries), batteries for high current rate applications, and thin-film batteries.

Although the present invention has been described by reference to particular embodiments, it is in no way limited thereby. To the contrary, modifications and variants will be apparent to those skilled in the art in the context of the following claims.

What is claimed is:

1. An article of manufacture comprising:

an electrically conductive substrate; and a film disposed on said substrate, said film comprising a material of at least one of germanium and silicon nanostructures, said material having a reversible capacity of at least 900 mAh/g and an irreversible capacity of less than 200 mAh/g.

2. The article of claim 1, wherein said substrate comprises an electrically conductive metal.

3. The article of claim 1, wherein said article comprises an electrode.

* * * * *

UNITED STATES PATENT AND TRADEMARK OFFICE
CERTIFICATE OF CORRECTION

| | | |
|---|---|---|
| PATENT NO. | : 6,514,395 B2 | Page 1 of 1 |
| APPLICATION NO. | : 10/012461 | |
| DATED | : February 4, 2003 | |
| INVENTOR(S) | : Otto Z. Zhou et al. | |

It is certified that error appears in the above-identified patent and that said Letters Patent is hereby corrected as shown below:

TITLE PAGE, INSERT UNDER ITEM (54) TITLE:

--Statement Regarding Federally Sponsored Research Or Development

At least some aspects of this invention were made with Government Support under Contract No. N00014-98-1-0597. The Government may have certain rights in this invention.--

Signed and Sealed this

Twenty-ninth Day of August, 2006

JON W. DUDAS
*Director of the United States Patent and Trademark Office*